(12) United States Patent
Stephan

(10) Patent No.: US 6,394,691 B1
(45) Date of Patent: May 28, 2002

(54) GRIPPING APPARATUS

(76) Inventor: George V. Stephan, 6793 N. Graham Rd., Madison, IN (US) 47250

( * ) Notice: Subject to any disclaimer, the term of this patent is extended or adjusted under 35 U.S.C. 154(b) by 2 days.

(21) Appl. No.: 09/621,224

(22) Filed: Jul. 21, 2000

(51) Int. Cl.[7] .......................... B23B 31/12; B23B 31/18
(52) U.S. Cl. .................... 403/344; 403/374.2; 403/364; 279/123; 279/106
(58) Field of Search .......................... 403/374.1, 374.2, 403/373, 344, 364; 279/106; 82/126, 127

(56) References Cited

U.S. PATENT DOCUMENTS

| | | | | |
|---|---|---|---|---|
| 190,043 A | * | 4/1877 | Hurd | 279/106 |
| 1,274,685 A | * | 8/1918 | Cline | 279/123 |
| 3,246,904 A | * | 4/1966 | Judge, Jr. | 279/123 |
| 4,346,945 A | * | 8/1982 | Tsuboi | 82/127 X |
| 4,353,561 A | * | 10/1982 | Peterson | 279/106 X |
| 4,838,562 A | * | 6/1989 | Akashi | 279/106 |

FOREIGN PATENT DOCUMENTS

FR   2248901 A1 * 5/1975 .................. 279/106

OTHER PUBLICATIONS

Albert A. Dowd, "Tool Engineering", American Machinist, vol. 57, No. 1, pp. 18–19, Jul. 6, 1922.*

* cited by examiner

Primary Examiner—Lynne H. Browne
Assistant Examiner—Ernesto Garcia
(74) Attorney, Agent, or Firm—Brinks Hofer Gilson & Lione

(57) ABSTRACT

A gripping apparatus is disclosed that includes a housing that has at least two pivot trays. Each pivot tray includes a jaw cavity and a pivot pin notch. The gripping apparatus further includes at least two jaws that have a pivot pin. Each jaw is positioned in a respective jaw cavity and each said pivot pin is positioned in a respective pivot pin notch. At least one retaining cap secured to said housing for securing said pivot pins in said pivot pin notch and thereby allowing said jaws to pivot within said respective jaw cavities.

15 Claims, 3 Drawing Sheets

GRIPPING APPARATUS

FIELD OF THE INVENTION

The present invention relates generally to tools used in construction and maintenance and, more particularly, to a gripping apparatus for securely gripping objects.

BACKGROUND OF THE INVENTION

Fences, signage, utility poles, basketball goals and other similar structures typically involve the use of poles or similar rigid members for structural support. When the structure is constructed or installed upon a surface, such as the soil of the earth, the members are typically inserted into a substrate of the surface to stabilize and anchor the associated structure. Installation of the members into the substrate can involve creating a hole in the surface and the substrate into which the member is inserted. The members can be rigidly maintained in the hole by introducing concrete, plastic, asphalt or other similar adhering material into the hole containing the member therein to bond the member with the surrounding substrate and surface. Installation of the member may also be accomplished by driving the member through the surface and into the substrate or packing the substrate materials around that portion of the member residing in the hole.

When it is desirable to remove or relocate a structure containing members fixedly positioned in the substrate of a surface, the members are also typically removed. Removal of the members and adhering materials bonded thereto requires releasing the bond between the member and the surrounding surface and substrate. This can be accomplished by physical removal of the members and associated adhering material from the surface and substrate. Removal of the members can be by removing the surrounding surface and substrate materials until the member is exposed. Another possible removal method is by using ropes or chains that may be coupling to the member and to a pulling force such as a vehicle. A third possible removal method is to cut the member below the surface and abandon the lower portion of the member that is bonded with the substrate.

Known problems occur with these methods of member removal. Specifically, excavation of the substrate surrounding the member and associated adhering materials is time consuming and results in a large excavated area. Pulling the member from the surface and substrate using a rope or chain can cause danger to humans and equipment since the rope or chain may slip off or break. In addition, the member can be bent, broken off or otherwise damaged thereby prohibiting reuse and possibly requiring further excavation of the surface and substrate to complete the removal. Further, the pulling action can create uncontrolled release of all or a portion of the member from the surface and substrate thereby creating a hazard for humans and surrounding structures. Abandonment of a portion of the member results in unwanted subsurface debris as well as the destruction of the member thereby prohibiting reuse.

In addition, some machines include members that need to be removed during repair or maintenance. When removing these members, it is often desirable to obtain a firm grip on the member to be removed. However, often the amount of pressure needed to get a secure grip on the member is more than can be applied by hands or conventional tools. As with other methods of removing members, known tools and methods used to remove the members can cause damage to the member and often are extremely difficult.

Accordingly, there is a need for a gripping apparatus that provides simple, non-destructive, controlled removal and transportation of fixedly positioned members.

SUMMARY OF THE INVENTION

The present invention discloses a gripping apparatus that includes a housing with at least two pivot trays. The pivot trays include a jaw cavity and a pivot pin notch. At least two jaws, each including a pivot pin, are provided and are positioned such that the jaws rest in a respective jaw cavity and the pivot pins are positioned in a respective pivot pin notch. In one embodiment of the present invention, at least one retaining cap is connected to the housing for securing the pivot pins in the pivot pin notches, thereby allowing the jaws to pivot within the jaw cavity of the housing. In the preferred embodiment of the present invention, a plurality of retaining caps are connected to the housing for securing the pivot pins in the pivot pin notches.

The housing of the gripping apparatus is circular in shape in the preferred embodiment of the present invention and comprises a first housing member that is removably connected with a second housing member. The first housing member includes a first male engagement member that has a first male aperture and a first female engagement member that has a first female aperture. The second housing member includes a second male engagement member that has a second male aperture and a second female engagement member that has a second female aperture. The first male engagement member is mates with the second female engagement member and the second male engagement member mates with the first female engagement member when the housing is assembled during operation.

A first fastening device is placed in the first male aperture and the second female aperture and a second fastening device is placed in the second male aperture and the first female aperture when the housing is assembled. The fastening devices are used to hold the housing securely together when the gripping apparatus is assembled. The first and second female engagement members comprise a rectangular notch in the first housing member and the second housing member. The male engagement members fit in each respective female engagement member, thereby forming a unitary housing. The housing may be one unitary member in alternative embodiments of the present invention, and not two sections that mate together and to form a unitary member.

As previously set forth, the preferred gripping apparatus includes jaws. The preferred jaws may include a first rounded end and another end, opposite the first rounded end, that may be flat, serrated, or formed semi-circular in shape. The rounded end allows the jaws to easily pivot in the jaw cavity of the housing. The other end of the jaws are used to grip the member to be gripping when the gripping apparatus is being used.

The present invention also discloses a method of gripping an object with a gripping apparatus. The method includes the step of positioning a housing that includes at least two pivot trays that have a jaw cavity and a pivot pin notch around the object to be gripped. After the housing is properly positioned, pressure is applied to the object with at least two jaws that include a pivot pin that is positioned in the pivot pin notch of the housing. The pivot pins are secured in the pivot pin notches by at least one retaining cap connected with the housing.

Other features and advantages of the invention will be apparent from the drawings and the more detailed description of the invention that follows. The foregoing discussion of the preferred embodiments has been provided only by way of introduction. This section should not be construed as a limitation on the following claims, which define the scope of the invention.

DETAILED DESCRIPTION OF THE PRESENTLY PREFERRED EMBODIMENTS

Figure 1:
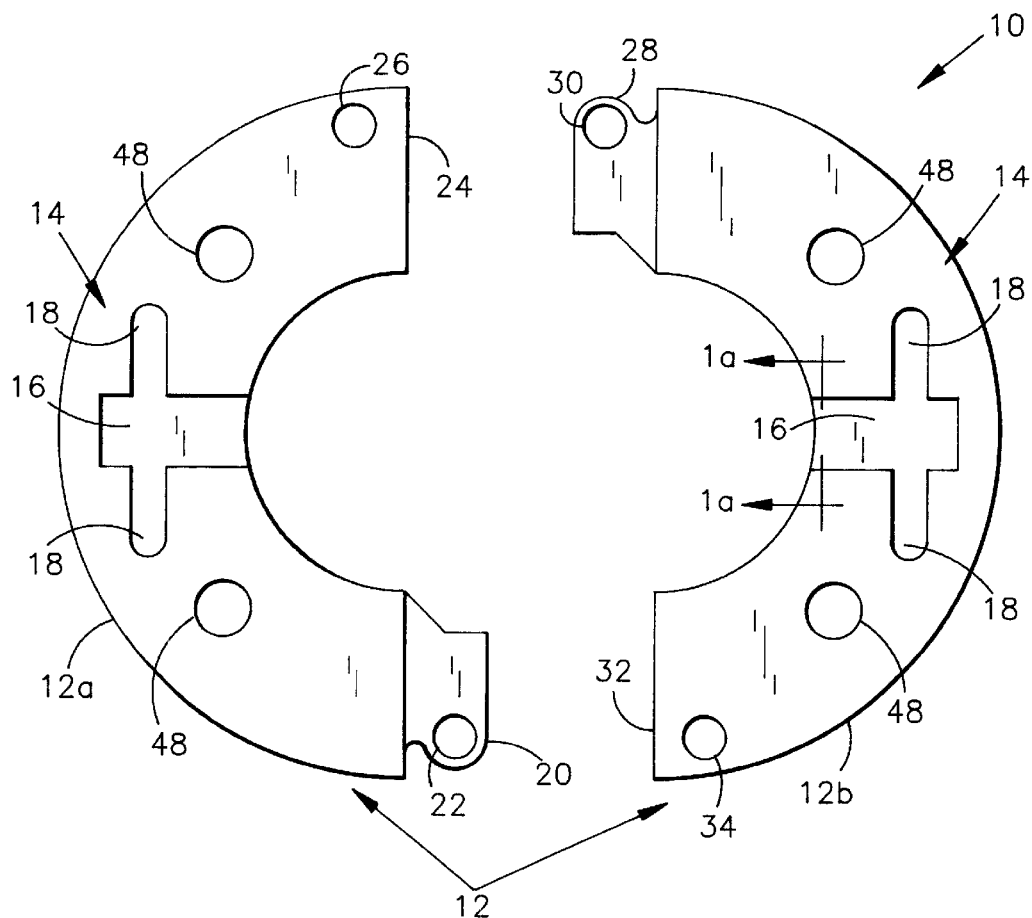
FIG. 1 is a top view of a preferred housing of the gripping apparatus.

Referring to FIG. 1, a portion of a preferred gripping apparatus 10 is illustrated that provides simple, non-destructive, controlled gripping for removal and/or transportation of certain types of members. The preferred gripping apparatus 10 includes a housing 12 that has at least two pivot trays 14. As further illustrated in FIG. 1, the pivot trays 14 have a jaw cavity 16 and a pivot pin notch 18. The preferred housing 12 is circular in shape, however, those skilled in the art would recognize that variations exist on the shape of the housing 12 and that the shape of the housing 12 should not be construed as a limitation of the present invention.

In the preferred embodiment of the present invention, the housing 12 comprises a first housing member 12a and a second housing member 12b. The first housing member 12a includes a first male engagement member 20 that has a first male aperture 22 and a first female engagement member 24 that has a first female aperture 26. The second housing member 12b includes a second male engagement member 28 that has a second male aperture 30 and a second female engagement member 32 that has a second female aperture 34. As set forth in FIG. 2a, when assembled, the engagement members 20, 24, 28, 32 mate together so that the housing 12 forms one complete unit. Although not illustrated in FIG. 1, in alternative embodiments of the present invention the housing 12 may be one complete unit and not two separate members that mate together to form one unit.

Figure 1A:
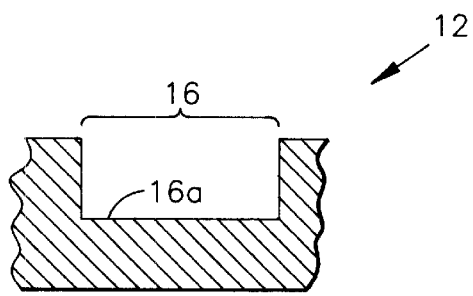
FIG. 1a is a cross-sectional front view of a portion of the jaw cavity located in the housing of the gripping apparatus illustrated in FIG. 1.
Figure 2:
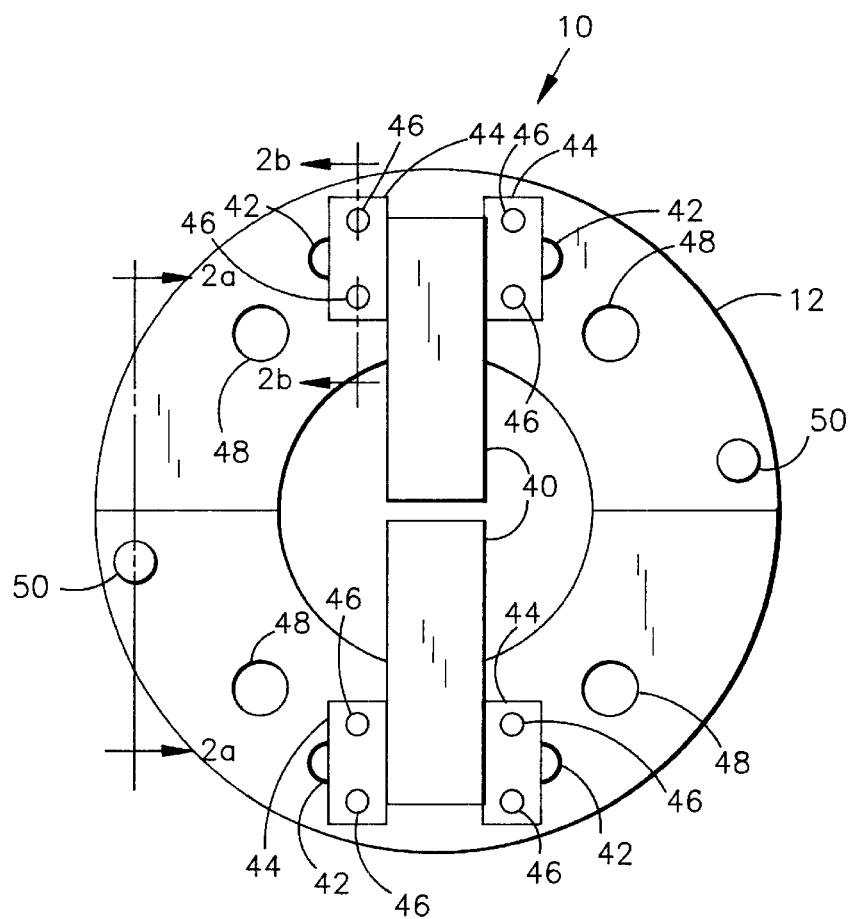
FIG. 2 is a top view of a preferred embodiment of the gripping apparatus.

Referring to FIG. 2, which illustrates a fully assembled gripping apparatus 10, at least two jaws 40 are provided that include a pivot pin 42. In the preferred embodiment, each jaw 40 is positioned in a respective jaw cavity 16 and each pivot pin 42 is positioned in a respective pivot pin notch 18. At least one retaining cap 44 is connected to the housing 12 to secure each pivot pin 42 in a respective pivot pin notch 18, thereby allowing the jaws 40 to pivot in the jaw cavity 16. In the preferred embodiment, a plurality of screws 46 are used to secure the retaining caps 44 to the housing 12, however those skilled in the art would recognize that other fastening devices may be used. Although two retaining caps 44 are illustrated for each jaw 40 in FIG. 2, those skilled in the art would recognize that one retaining cap 44 for each jaw 40 may be used as well, Referring to FIG. 1a, which illustrates a cross-sectional front view of a portion of the housing 12 illustrated in FIG. 1, the preferred jaw cavity 16 is formed as a rectangular cavity in the housing 12. In the preferred embodiment, the housing 12 is made from steel, or some other similar material, and the jaw cavity 16, as well as the pivot pin notch 18, are machined out of the housing 12. Those skilled in the art would recognize that various methods of machining exist and may be used to form the jaw cavity 16 and the pivot pin notch 18 in the housing 12.

Referring to FIGS. 1a and 2, a bottom surface 16a of the jaw cavity 16 is used as a stop for the jaws 40. As such, the jaws 40 will stop pivoting once they make contact with the bottom surface 16a of the jaw cavity 16. During operation, if the housing 12 and jaws 40 are placed around a post or pole that is inserted vertically, or some other similar member, upwards force in the housing 12 causes the jaws 40 to clamp down on the member and obtain a firm grip. Downwards pressure on the housing 12 causes the jaws 40 to release pressure, thereby loosening the grip on the member. A plurality of support apertures 48 are included in the housing to allow various devices to be secured to the housing 12 for applying force to the housing 12. Those skilled in the art would recognize that various applications exist for the present invention and that it may be used on objects that are not necessarily vertically inserted as well.

Figures 2A, 2B:
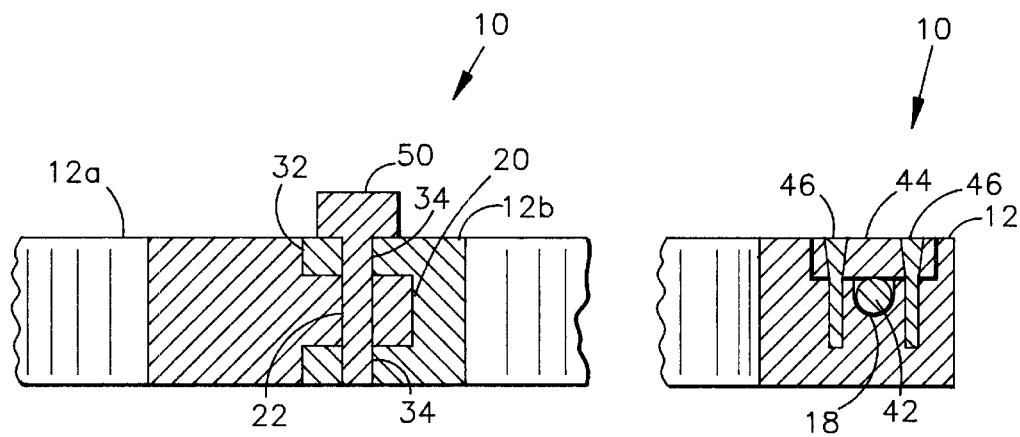
FIG. 2a is a cross-sectional side view of the hashed portion of the gripping apparatus illustrated in FIG. 2.
FIG. 2b illustrates a cross-sectional side view of the hashed portion of the gripping apparatus illustrated in FIG. 2.

Referring to FIG. 2a, which illustrates a cross-sectional view of a portion of the preferred gripping apparatus 10 illustrated in FIG. 2, as previously set forth when the preferred housing 12 is assembled it forms one complete unit. In FIG. 2a, the first male engagement member 20 of the first housing member 12a is illustrated positioned as assembled in the second female engagement member 32 of the second housing member 12b. In the preferred embodiment, the housing members 12a and 12b are held securely in place by a fastening device 50, such as a screw or pin for example, that is placed in apertures 22, 26, 30, 34, respectively. Those skilled in the art would recognize that several fastening devices 50 exist that may be used to secure the housing members 12a and 12b together.

Referring to FIG. 2b, which illustrates a cross-sectional side view of a portion of the gripping apparatus 10 depicted in FIG. 2, in the preferred embodiment the retaining caps 44 are recessed into the housing 12. As such, the retaining caps 44 and the fastening devices 46 are mounted flush with the upper surface of the housing 12 to FIG. 2b also illustrates the manner in which the pivot pins 42 are secured in the respective pivot pin notches 18 that are located in the housing 12. As illustrated, when secured to the housing 12 the retaining caps 44 secure the pivot pins 42 in the pivot pin notches 18, thereby allowing the jaws 40 to pivot during operation.

Figure 3:
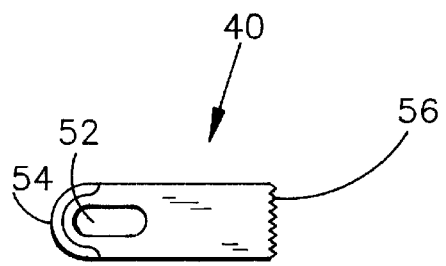
FIG. 3 illustrates a side view of an illustrative preferred jaw.

FIG. 3 depicts a side view of one preferred jaw 40 that may be used in the present invention. As illustrated, in this embodiment the jaw 40 includes a pivot pin aperture 52. The pivot pin aperture 52 allows the pivot pins 42 to easily be placed in the pivot pin notches 18 of the housing 12. Although not illustrated in FIG. 3, the pivot pin 42 may also be included in the jaw 40, which means the pivot pin 42 would be an integral part of the jaw 40.

As further illustrated in FIG. 3, the jaw 40 may include a rounded end 54 and a serrated end 56. The rounded end 54 allows the jaw 40 to easily pivot in the jaw cavity 16 of the housing 12 and the serrated end 56 allows the jaw 40 to obtain a better grip on the member that the gripping apparatus 10 is being used to grip. However, those skilled in the art would recognize that serrated ends 62 are disclosed by way of example only, and that circular, flat and various other ends may be provided on the jaws 40. In addition, those skilled in the art would recognize that the jaws 40 may be manufactured in various lengths, to accommodate different sized members that need to be gripped during operation.

Figure 4:
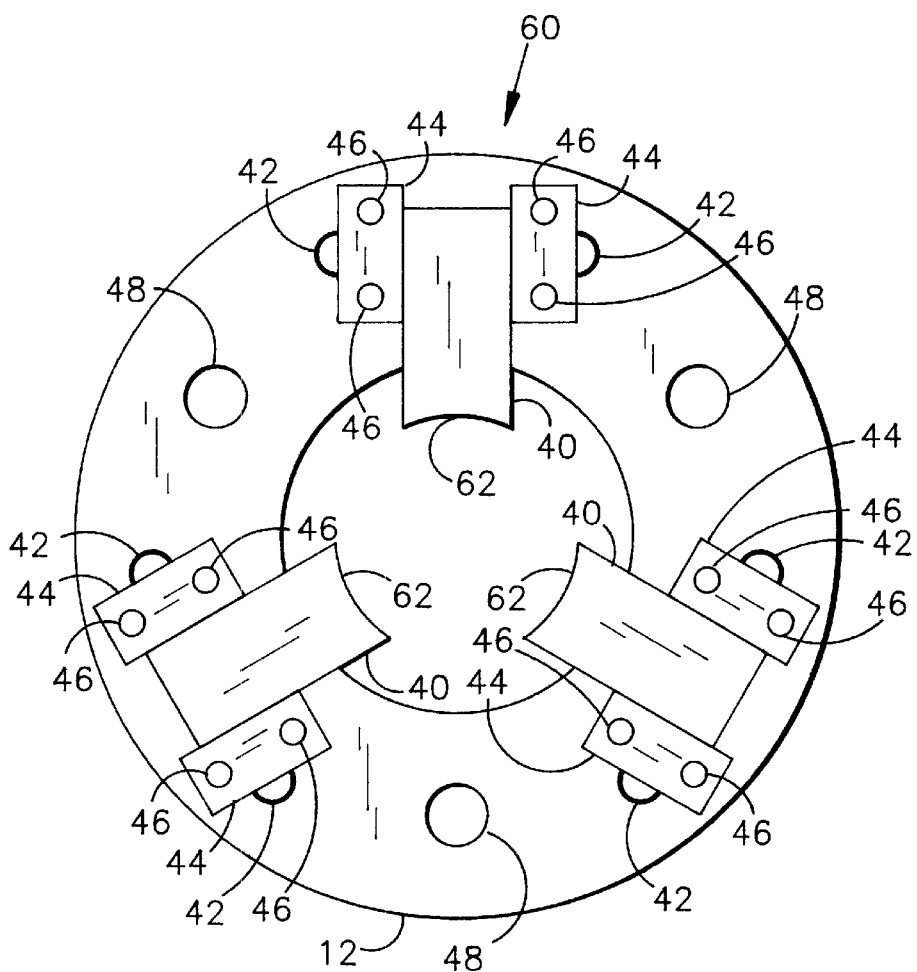
FIG. 4 illustrates another preferred embodiment of a gripping apparatus.

Referring to FIG. 4, another preferred gripping apparatus 60 is illustrated that includes three pivot trays 16. Although this embodiment includes three pivot trays 16, the remaining features of the gripping apparatus 60 remain essentially unchanged from the discussion of the embodiment set forth in FIG. 2. In this embodiment, the center of the jaws 40 are separated by approximately 120° and as illustrated, are preferentially formed with semi-circular ends 62 that are preferentially used to grip round objects and members. As previously set forth, the gripping end of the jaws 40 may be formed in several shapes and configurations, depending upon the particular application.

While the invention has been described in its currently best known modes of operation and embodiments, other modes and embodiments of the invention will be apparent to those skilled in the art and it is the following claims, including all equivalents, that are intended to define the spirit and scope of the invention.

What is claimed is:

1. A gripping apparatus comprising:
    a housing including at least two pivot trays, wherein each said pivot tray includes a jaw cavity and a pivot pin notch;
    at least two jaws each including a pivot pin, wherein one end of each of said jaws includes a serrated edge, each said jaw is respectively positioned in the jaw cavity and each said pivot pin is respectively positioned in the pivot pin notch; and
    at least one retaining cap secured to said housing for securing said pivot pins in said pivot pin notch, thereby allowing said jaws to pivot within said respective jaw cavities.

2. The gripping apparatus of claim 1, wherein said housing is circular.

3. The gripping apparatus of claim 1, wherein said housing comprises a first housing member removably connected with a second housing member.

4. The gripping apparatus of claim 3, wherein said first housing member includes a first male engagement member having a first male aperture and a first female engagement member having a first female aperture, said second housing member including a second male engagement member having a second male aperture and a second female engagement member having a second female aperture.

5. The gripping apparatus of claim 4, wherein said first male engagement member is removably connected with said second female engagement member and said second male engagement member is removably connected with said first female engagement member when said housing is assembled.

6. The gripping apparatus of claim 4, wherein a first fastening device is placed in said first male aperture and said second female aperture and a second fastening device is placed in said second male aperture and said first female aperture when said housing is assembled.

7. The gripping apparatus of claim 4, wherein said first and said second female engagement members each comprise a rectangular notch formed in said first housing member and said second housing member.

8. The gripping apparatus of claim 1, wherein one end of said jaws includes a semi-circular shaped edge.

9. A gripping apparatus comprising:
    a housing including at least two pivot trays, wherein each said pivot tray includes a jaw cavity and a pivot pin notch, said housing comprising a first housing member removably connected with a second housing member, wherein said first housing member includes a first male engagement member having a first male aperture and a first female engagement member having a first female aperture, said second housing member including a second male engagement member having a second male aperture and a second female engagement member having a second female aperture;
    at least two jaws each including a pivot pin slot;
    a pivot pin positioned in said pivot pin slot of said jaws such that a portion of said pivot pin that is not located in said pivot pin slot is respectively positioned in the pivot pin notch in said housing; and
    at least one retaining cap connected with said housing to secure said pivot pins in said pivot pin notches thereby allowing said jaws to pivot within said jaw cavity of said housing.

10. The gripping apparatus of claim 9, wherein said housing is circular.

11. The gripping device of claim 9, wherein said first male engagement member is removably connected with said second female engagement member and said second male engagement member is removably connected with said first female engagement member when said housing is assembled.

12. The gripping apparatus of claim 11, wherein a first fastening device is placed in said first male aperture and said second female aperture and a second fastening device is placed in said second male aperture and said first female aperture when said housing is assembled to secure the housing together.

13. The gripping apparatus of claim 9, wherein said first and said second female engagement members each comprise a rectangular notch formed in said first housing member and said second housing member.

14. The gripping apparatus of claim 9, wherein one end of said jaws includes a semi-circular shaped edge.

15. The gripping apparatus of claim 9, wherein one end of said jaws includes a serrated edge.

* * * * *